Aug. 18, 1942.  A. J. HIGGINS  2,293,504

CLUTCH RELEASE LEVER CONTROL

Filed Nov. 2, 1940

Inventor
A. J. Higgins
By Mason Fenwick & Lawrence
Attorneys

Patented Aug. 18, 1942

2,293,504

UNITED STATES PATENT OFFICE 2,293,504

CLUTCH RELEASE LEVER CONTROL

Andrew J. Higgins, New Orleans, La., assignor to Higgins Industries, Inc., New Orleans, La., a corporation of Louisiana Application November 2, 1940, Serial No. 364,067

5 Claims. (Cl. 74—524)

This invention relates to control devices for marine engines and more particularly to a clutch lever.

The clutch on marine engines is subjected to unusual wear by reason of the vibrations of the boat as well as the pitching and roll of the boat with the resultant tendency of the clutch lever to oscillate and cause the clutch plates to slightly engage with resultant friction and wear.

The object of the present invention is to provide an improved clutch lever adapted for either manual operation or power operation in which the lever is flexed while the clutch is engaged and is only rigid during the sector of its stroke operative on the clutch shaft.

The invention consists in the novel construction, arrangement and combinations of parts hereinafter more particularly described and claimed.

One sheet of drawings accompanies this specification in which like reference characters indicate like parts throughout:

Figure 1:
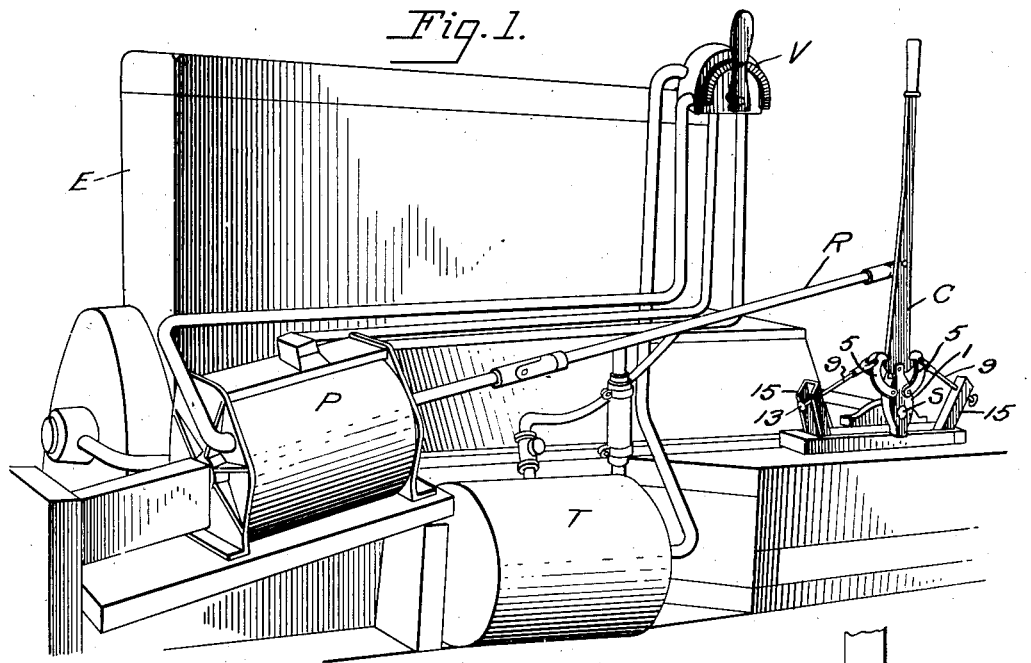
Figure 1 is a perspective view of a possible layout of a marine engine showing the improved clutch lever associated with a power control.
Figure 3:
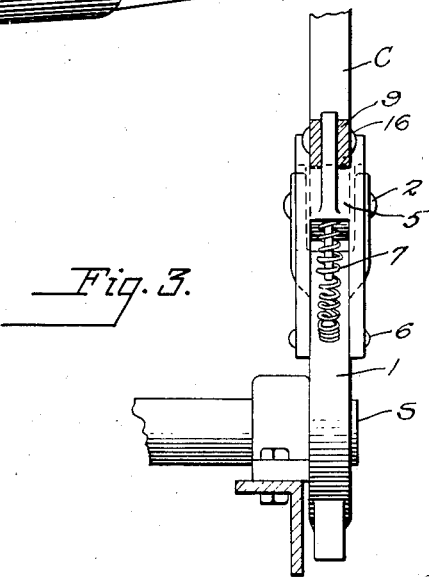
Figure 3 is a fragmentary cross section taken on line 3—3 of Figure 2.

As illustrated in Figure 1, the marine engine E has the clutch shaft S associated with a clutch lever C connected by a rod R to the piston of a power cylinder P operated by compressed air from a tank T controlled by a valve V.

Figure 2:
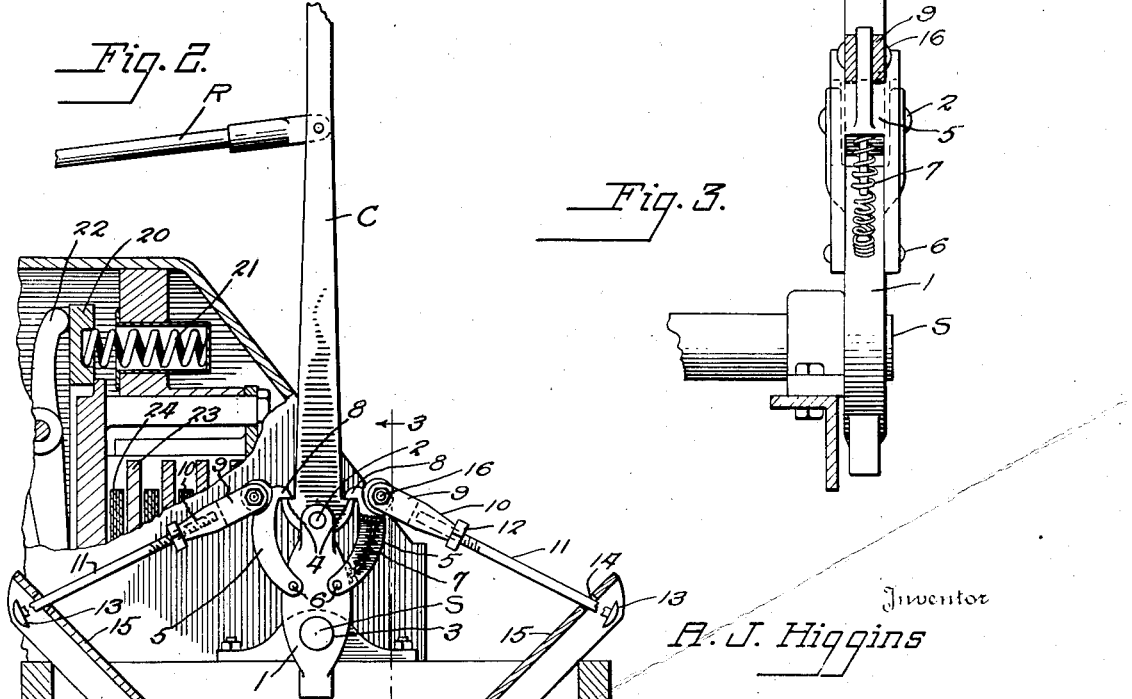
Figure 2 is a side elevation of the improved clutch lever with a portion of the clutch casing in cross section.

The clutch device, portions of which are illustrated diagrammatically in Figure 2, consists generally of a plurality of friction plates 23—24 controlled by a ring 20 subject to the tension of a plurality of circumferentially arranged springs 21 and by fingers 22. When the clutch is thrown in, the tension of springs 21 forces friction plates 23—24 to engage and thus transmit power from the engine shaft to the propeller shaft. Any vibration or rolling of the vessel which causes pressure on the ring 20 intermittently will necessarily affect the tension of springs 21 and thus modify the frictional contacts of plates 23—24, permitting slipping of such plates with undue friction and wear. The principal cause or source of such undesirable interference with the clutch is the clutch lever which is necessarily of substantial construction and which, where connected with a power drive and associated with connecting rod R, may, if rigid, exert considerable effect on the clutch shaft S.

To avoid this difficulty, applicant constructs the clutch shaft C in two parts. A short arm 1 is provided with a seat 3 by which it is rigidly mounted on the clutch shaft S. The main lever C is connected to the other end of arm 1 as by pivot 2, and this part of the lever is provided, near the pivoted end, with oppositely disposed shoulders 4—4 adapted to engage oppositely disposed dogs 5—5 pivoted to the short arm 1 as at 6—6. It will be noted that the pivots 2, 6 and the clutch shaft S are all parallel. The dogs 5 are preferably bifurcated and provided with the compression spring 7 which operate to tension the dogs into engagement with the shoulders 4 of part C. The dogs 5 are provided with inwardly projecting lugs 8 substantially coextensive with shoulders 4 adapted to seat on said shoulders.

Pivoted to each of the dogs 5—5 are anchoring bolts 9 secured as by pivot 16 to the free ends of each dog and these bolts 9 are preferably formed in two parts, one having a threaded sleeve 10 into which the threaded end of a rod 11 is adjustable and secured in adjusted position as by lock nut 12. The rod 11 is provided with a head 13 and passes through a hole 14 in a part 15 of the engine frame.

By reason of the structure thus described, it will be apparent that in the position of lever C as shown in Figure 2, both of the dogs are engaged with their respective shoulders and the entire lever is rigid. The clutch can be thrown into engagement in forward or reverse by being thrown to the left or right. As the lever is thrown in either direction, it will be noted that the trailing dog will continue in engagement with its shoulder until the head of its anchoring bolt engages the part 15 which point is predetermined by adjustment of the length of the anchoring bolt to correspond with the point at which the clutch becomes engaged. The further stroke of the lever withdraws the trailing dog from engagement with its shoulder and thus breaks the clutch lever at pivot 2 with the other dog, however, still in engagement. Upon the return stroke of the lever, it will re-engage the forward dog with its shoulder when it reaches neutral position, again providing a rigid clutch lever.

Various modifications will readily suggest themselves to those skilled in the art, all within the scope of the present invention as claimed.

Having thus fully disclosed my invention, what I claim is:

1. A marine engine clutch lever comprising two parts pivotally connected end to end in lineal alignment with said parts oppositely disposed, inter-engaging members carried by the respective levers for rigidly holding said parts in said alignment, with means limiting the operation of said inter-engaging members to a limited part of the lever stroke, one of said lever parts formed with means on the end opposed to said pivotal connection for securing it to a clutch shaft.

2. The device of claim 1 in which the inter-engaging holding means comprise fixed members on one lever part and rockable pivoted members on the other lever part, with spring means associated with each pivoted member biasing said member toward a fixed member and anchoring means associated with each pivoted member limiting the movement of said member.

3. A clutch lever comprising two parts pivotally associated at their ends, one part provided at its opposite end with means for securing it to a clutch shaft, dogs pivotally mounted on opposite sides of one of said parts, the end of the lever part adjacent to the dog-carrying part being provided with oppositely disposed shoulders, means for tensioning the dogs into engagement with said shoulders and means for anchoring the dogs to limit the movement of said dogs in opposite directions and with respect to the lever parts.

4. A clutch lever comprising two parts pivotally associated at their ends, one part provided at its opposite end with means for securing it to a clutch shaft, dogs pivotally mounted on opposite sides of one of said parts, the pivot associating the two lever parts being parallel with the pivots associating the dogs with their lever part and also parallel with the axis of the clutch shaft, the end of the lever part adjacent to the dog carrying part being provided with oppositely disposed shoulders, means for tensioning the dogs into engagement with said shoulders, and adjustable means for anchoring the dogs to limit the movement of the dogs in opposite directions and with respect to the lever parts.

5. A clutch lever as specified in claim 4, in which the dogs are formed with inwardly projecting lugs substantially coextensive with said shoulders and adapted to seat thereon.

ANDREW J. HIGGINS.